(12) United States Patent
Erbe et al.

(10) Patent No.: US 7,000,635 B2
(45) Date of Patent: Feb. 21, 2006

(54) DOUBLE VALVE

(75) Inventors: Guntram Erbe, Neudietendorf (DE);
Erwin Hochstuhl, Bühl (DE);
Kunibert Neu, Wangen/Göpp (DE);
Karl-Anton Wissler, Rastatt (DE);
Martin Wetzel, Rastatt (DE)

(73) Assignee: Siemens Building Technologies AG, Zurich (CH)

( * ) Notice: Subject to any disclaimer, the term of this patent is extended or adjusted under 35 U.S.C. 154(b) by 0 days.

(21) Appl. No.: 10/472,659

(22) PCT Filed: Mar. 15, 2002

(86) PCT No.: PCT/IB02/00849

§ 371 (c)(1),
(2), (4) Date: Feb. 12, 2004

(87) PCT Pub. No.: WO02/081953

PCT Pub. Date: Oct. 17, 2002

(65) Prior Publication Data

US 2004/0129321 A1 Jul. 8, 2004

(30) Foreign Application Priority Data

Mar. 22, 2001 (DE) .......................................... 101 14 249

(51) Int. Cl.
*F16K 11/10* (2006.01)

(52) U.S. Cl. .............................. 137/625.36; 137/614.19

(58) Field of Classification Search ............ 137/625.33, 137/625.34, 625.36, 614.19
See application file for complete search history.

(56) References Cited

U.S. PATENT DOCUMENTS

| 1,033,204 A | * | 7/1912 | Skinner ................. 137/625.34 |
| 1,206,532 A | * | 11/1916 | Gray .......................... 417/252 |
| 1,213,852 A | * | 1/1917 | Brown ........................ 219/57 |
| 1,356,925 A | * | 10/1920 | Knox ......................... 137/346 |
| 1,567,030 A | | 12/1925 | Bryant |
| 3,942,437 A | * | 3/1976 | Hatsuse ...................... 101/111 |
| 6,330,880 B1 | * | 12/2001 | Okada et al. ............. 123/568.2 |

FOREIGN PATENT DOCUMENTS

| DE | 1025226 B | 2/1958 |
| EP | 0985817 A | 3/2000 |

* cited by examiner

*Primary Examiner*—John Fox
(74) *Attorney, Agent, or Firm*—Maginot, Moore & Beck

(57) ABSTRACT

The invention relates to a double valve with a valve housing (1), for housing two double-headed actuators (30, 31), whereby the double head actuators have differing head diameters (12, 13) and the flow of a fluid through the both actuators (30, 31) in the valve housing (1) is identical. The valve housing (1) is of one-piece design and a drive function for both actuators (30, 31) is not connected to the inner volume of the valve housing (1) with fluid flowing therein.

8 Claims, 2 Drawing Sheets

DOUBLE VALVE

Figure 1:
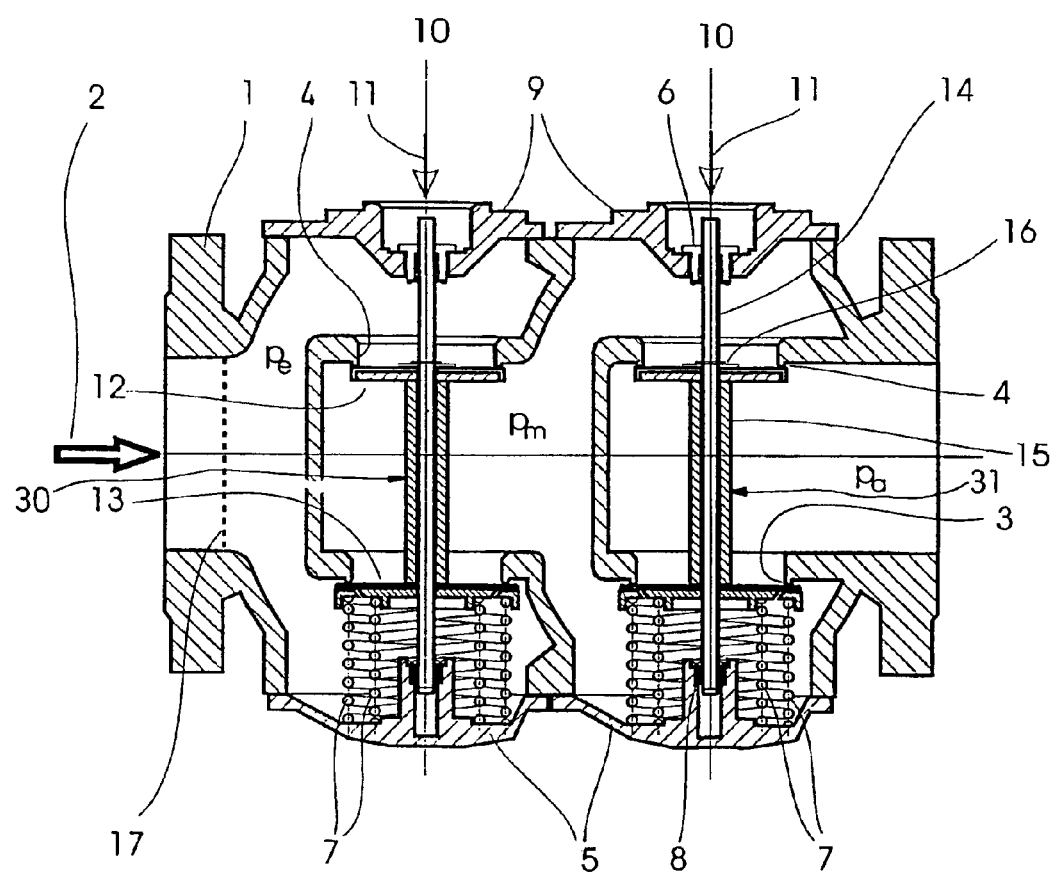

The present invention concerns a double valve as set forth in the classifying portion of claim 1.

Double-seat valves are known for example from DE 31 46 590, describing double-seat valves in which the internal diameters of the valve seats are relatively greatly different. As a result, when pressure is applied between the valve disks, the opening force of the upper valve disk which is of a larger internal diameter is greater than the closing force at the lower valve disk.

In terms of gas applications, a multiple actuating device has gained general acceptance on a broad basis as a safety and regulating unit upstream of the heat producer, for example a gas fan burner, because in one unit it contains the required safety functions—at least two safety shut-off valves in series—or it permits an additional function to be added on. Besides the economic advantages involved, this compact structure affords a high guarantee in respect of the safety and monitoring functions for the user in particular in regard to the safety regulations to be observed.

Those multiple actuating devices are to be found in gas applications both in the lowest and also in the highest output range. Even if safety functions are combined with regulating or control functions the actuator and the prescribed closing spring remain the determining components which ensure reliable closure.

If the single-disk actuators for the two valves and the regulator are the characterising structural feature in relation to the small multiple actuating devices for output values<50 kW, it is clearly the double-disk actuators which determine the structural configurations of the housings, up into the high output levels. Particularly with nominal widths of greater than DN 50 with the same housing length and without a loss of through-flow the double actuator makes it possible to install two shut-off valves.

Double solenoid valves are known which cover the nominal width range of DN 40 to DN 125 and which are equipped with solenoid drives. Also known are double-disk actuators, comprising however single valve housings, which can be assembled together to form multiple actuating devices. That provides that the afflux flow to the two actuators is identical, which is not the case with housing types from other manufacturers. If for example housings of that kind are produced in the form of die castings without insert cores, then, as considered in the through-flow direction, they are of a center-symmetrical design configuration, with the consequence that the gas flows to the two double-disk actuators once from the inside and once from the outside, which, depending on the respective nature of the two disk diameters on the double-disk actuator, results on the one hand in a force having an opening action and on the other hand a force having a closing action, due to the gas intake pressure.

The object of the present invention is to provide a double valve having a valve housing for two actuators, which avoids those disadvantages.

According to the invention the specified object is attained by the features recited in the independent claims.

Therefore the core of the invention is that the valve housing is of a one-piece configuration and that a drive function of the two actuators is not connected to the internal space of the valve housing, through which space the fluid flows.

In order to provide the same conditions for a gas intake pressure force acting in a closing mode for both actuators in the case of one-piece housings, it is necessary to have recourse to casting production with insert cores. In contrast to the center-symmetrical valve housings the new housing types have only one through-flow direction, in relation to the actuator.

Those housings afford the greatest advantage when the drives used are in the form of complete functional units which, besides the pure function of automatically opening and autonomously implementing closing, can also take over regulating functions. If in addition the valve housing in itself is designed in the form of a safety component which involves sealing integrity in the closed position in the through-flow direction and outwardly, all drive and regulating functions can be added on to the actuator axis at the intake and/or exit side.

That deliberate separation of the gas space of the valve housing and the drives which thus operate in the ambient atmosphere affords great advantages which increase with an increasing nominal width, from the point of view of the installer on site, due to the saving in weight and handling of the smaller valve volume upon installation in the conduit.

A replacement of or a change in drive functions is facilitated in comparison with the known valves as it is not necessary to intervene into the gas space, so that a check in respect of sealing integrity which is otherwise prescribed when changing the drive is no longer involved.

The entire logistics can be simplified if the user himself determines the nature and the location for the drive, without for that purpose previously ordering a complete assembly from the manufacturer. Thus pneumatically or hydraulically driven servo motors with additional functions such as pilot regulators, equal-pressure regulators, zero-pressure regulators, reference value regulators or composite regulators are nowadays in use as standard drive configurations. It is also found here that the modular structure permits a highly flexible design configuration for the multiple actuating device. If then those drives are also suitable for the entire range of valve housings, that attains a very high level of logistic advantages.

Further advantageous configurations of the invention are set forth in the appendant claims.

Figure 2:
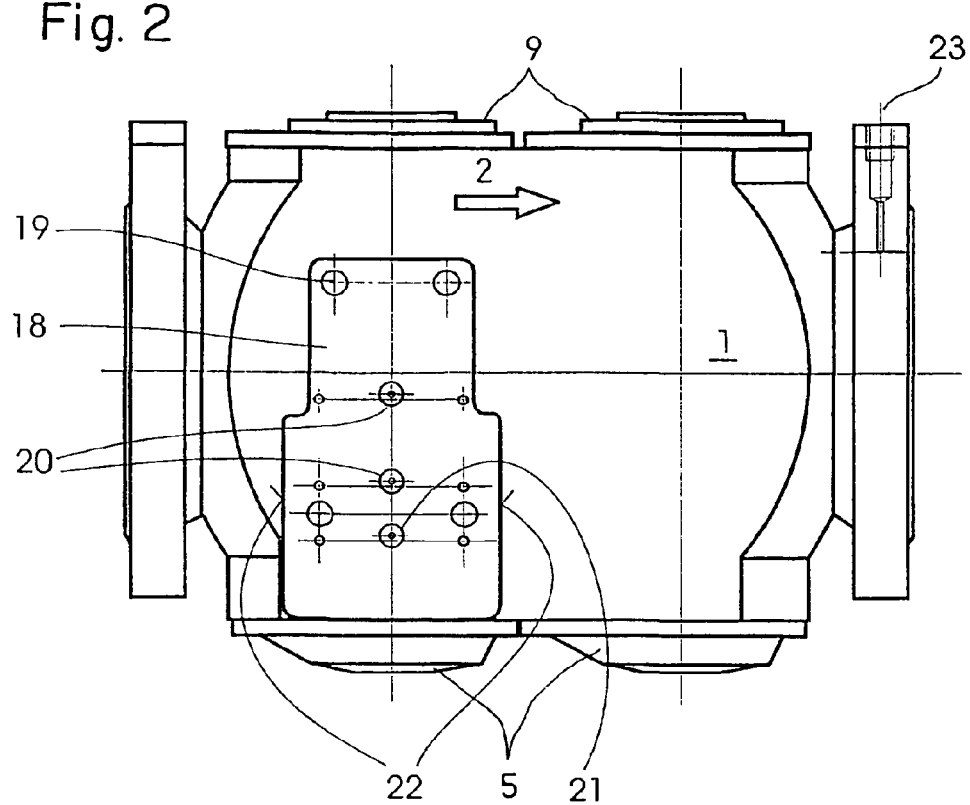
Figure 3:
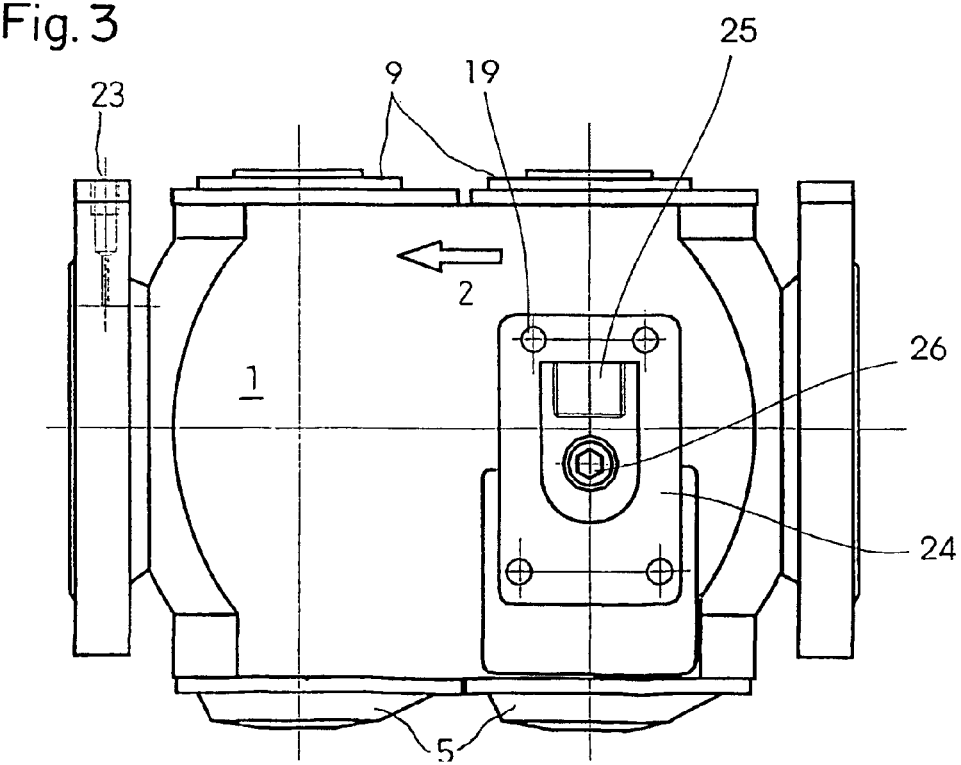

Some preferred embodiments of the apparatus according to the invention and the method according to the invention are described in greater detail by means of the accompanying drawings in which:

FIG. 1 is a view in longitudinal section of the valve housing according to the invention for the construction of a multiple actuating device, FIG. 2 shows a side view of the valve housing with a flange-mounted universal adaptor, and FIG. 3 shows a side view of the valve housing with a flange-mounted ignition gas connection flange.

The valve housing 1 which is shown in FIG. 1 and through which fluid flows in the direction marked by the arrow 2 forms three spaces. The intake space which is subjected to the action of the intake pressure $P_e$, the central space which is disposed between the two actuators 30, 31 and in which in operation the central space pressure $P_m$ obtains, and the exit space downstream of the actuator 31 on the exit side, in which the exit pressure $P_a$ or the burner pressure fed to the burner is measured.

The valve housing 1 is characterised by the two axes 10 of the double-disk actuators 30, 31, wherein each axis has a large valve seat diameter 3 and a small valve seat diameter 4 in such a way that the small disk 12 fits through the internal diameter of the seat 4. The diameter difference between the large and the small valve seat diameters forms a circular ring surface which, by virtue of the intake pressure (or central space pressure), produces a force for closing the actuator. That force is so divided by virtually flexurally slack subdivision of the large disk 13 that the valve seats 3 and 4 involve approximately the same closing force component due to the respectively applied gas pressure. To comply with the check in respect of sealing integrity in the counter-flow direction, as is prescribed for gas safety valves, two closing springs 7 are installed for each actuator axis in order to produce the necessary closing pressure at the valve seat. The disks are provided at the seat side with a sealing material vulcanised thereto.

The arrows 11 illustrate the opening direction for the drives. The arrangement requires drives with a pushing force which acts on the thrust rod 14, in which case then the positively engaging elements 16 transmit the force to the small disk 12. The force is transmitted by way of the sleeve 15 to the large disk 13 which is supported on the closing spring pack 7. The thrust rod 14 is guided in the mounting locations 6 and 8 which are far apart so that the double-disk actuator involves the smallest amount of wobble in relation to the valve seats. The mounting location 6 additionally has sealing elements in order to ensure atmospheric sealing integrity of the valve housing.

The housing covers 9 close the valve housing upwardly and the two covers 9 permit installation of the actuators-and the spring packs on the bottom side of the valve housing. All covers are sealed off relative to the valve housing by static seals (not shown).

A sieve filter fitted in the intake of the valve housing is intended to prevent the introduction of relatively coarse impurities which can influence operation of the valve.

It must be possible to monitor a gas safety and regulating system, and this is substantially improved by the direct attachment of testing devices to the valve housing of the multiple actuating device.

The universal flange 18 shown in FIG. 2 takes account of those requirements insofar as two pressure monitors can be mounted on the front side of the flange, wherein one can monitor the gas intake pressure (safeguard against deficiency of gas) by way of the gas connection 21 and the other can monitor the central space pressure by way of one of the two connections 20. The arrangement also provides for direct mounting of a valve testing system (sealing integrity control in respect of the closed actuators) by way of the connection 21 and the adjacent connection 20.

If a valve testing device is fitted, then, for the attachment of a gas pressure monitor for example for monitoring for an absence of gas, it must be switched to one of the two side surfaces 22.

The universal flange is so designed that monitoring devices from various manufacturers can be fitted. The exit pressure or the burner pressure can be taken off and/or monitored at the pressure measuring connection 23.

A flange is fixed to the valve housing opposite the universal flange in FIG. 3, with the same fixing pattern 19 (one of the four fixing screws is identified), the flange permitting the connection of an ignition gas conduit to the burner. The ignition gas flange 24 forms a connection between the central space of the valve housing and the ignition gas valve by way of a gas conduit which is to be screwed in the screwthreaded connection 25. The screwthreaded connection which is closed by a plug 26 is provided as a pulse connection for a drive with regulator function, the drive being placed on the intake-side actuator axis.

Depending on whether the situation involves a left-hand or a right-hand gas line the universal flange can be exchanged for the ignition gas flange. Both the universal flange and also the ignition gas flange are adopted unchanged for the entire product family.

It will be appreciated that the invention is not limited to the embodiments described and illustrated.

What is claimed is:

1. A double valve comprising a valve housing (1) for receiving two serially connected double-disk actuators (30, 31), wherein the double-disk actuators have different disk diameters (12, 13) and the afflux flow by a fluid to the two actuators (30, 31) in the valve housing (1) is identical, characterised in that the valve housing (1) is of a one-piece configuration and that a drive function of the two actuators (30, 31) is not connected to the internal space of the valve housing (1), through which space the fluid flows.

2. A double valve as set forth in claim 1 characterised in that the drive function of the two double-disk actuators (30, 31) is effected from the same side of the valve housing (1).

3. A double valve as set forth in claim 1 characterised in that the drive function of the two double-disk actuators (30, 31) is flange-mounted to the valve housing (1).

4. A double valve as set forth in claim 1 characterised in that the valve housing is sealingly closed by covers (9) on the drive side and by covers (5) on the underside.

5. A double valve as set forth in claim 1 characterised in that at the outside the valve housing (1) is of such a configuration that at least one flange (18, 24) can be mounted.

6. A double valve as set forth in claim 5 characterised in that the flange is a universal flange (18) or an ignition gas flange (24).

7. A double valve as set forth in claim 6 characterised in that a universal flange (18) and an ignition gas flange (24) are arranged at the outside of the valve housing (1).

8. A double valve as set forth in claim 7 characterised in that depending on the respective direction of installation of the valve housing (1) the universal flange (18) and the ignition gas flange (24) are arranged on different sides of the valve housing (1).

* * * * *